United States Patent [19]
Rigal et al.

[11] 3,946,892
[45] Mar. 30, 1976

[54] DOUBLE WALL VESSEL

[75] Inventors: Jean Rigal, St. Etienne (Loire); Jacques Troton, Fraisses, both of France

[73] Assignee: Creusot-Loire, Paris, France

[22] Filed: Feb. 14, 1972

[21] Appl. No.: 225,773

[30] Foreign Application Priority Data
Mar. 12, 1971 France............................ 71.08608

[52] U.S. Cl.................... 220/9 B; 220/15; 428/120
[51] Int. Cl...... B32b 3/12; B65d 25/18; B65d 25/00
[58] Field of Search........ 220/9 B, 15, 83, 9 R, 9 A; 161/68, 69; 55/525, 526; 165/154; 229/DIG. 2

[56] References Cited
UNITED STATES PATENTS

| 2,558,185 | 6/1951 | Leisen.................................. 55/525 |
| 2,609,068 | 9/1952 | Pajak................................... 161/68 |
| 3,675,809 | 7/1972 | McGrew et al. .................... 220/9 B |

*Primary Examiner*—George E. Lowrance
*Assistant Examiner*—Allan N. Shoap
*Attorney, Agent, or Firm*—Cameron, Kerkam, Sutton, Stowell & Stowell

[57] ABSTRACT

A double-walled vessel wherein a grid is located between the walls to provide a support for the inner wall, the grid being made up of strips which are on edge and which define interconnected cells for passage of a fluid between the walls.

6 Claims, 1 Drawing Figure

U.S. Patent  March 30, 1976  3,946,892
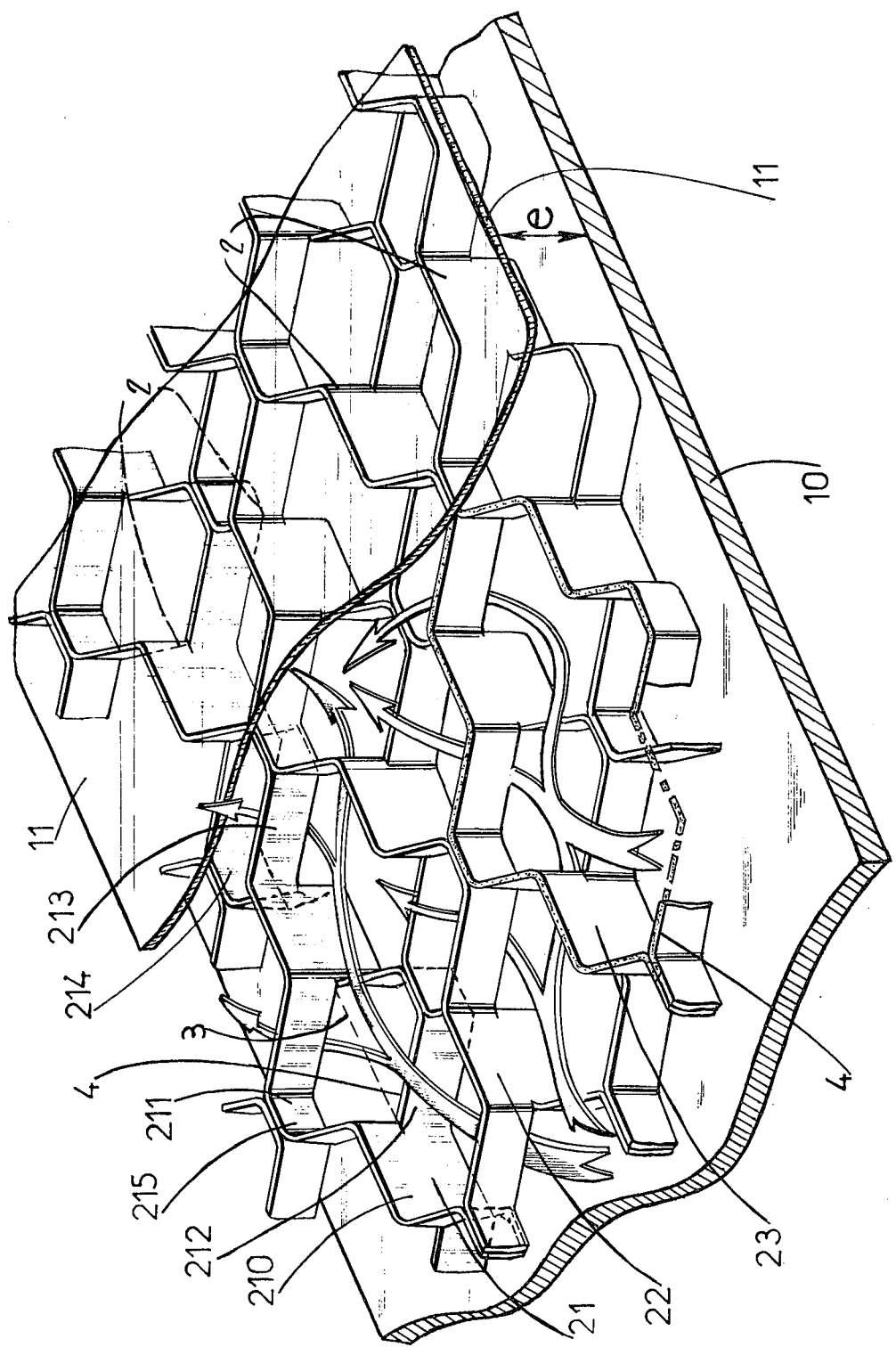

DOUBLE WALL VESSEL

The invention relates to improvements to double-walled vessels whose wall comprises two equidistant envelopes separated by a gap within which a fluid can flow.

The invention applies particularly to vessels in which chemical reactions take place, for example polymerization reactors. The inside surface of the wall of such a vessel must, of course, be able to resist corrosion from the substances contained and is often made from special steel. Since it would cost too much to use the same steel for a wall capable both of resisting corrosion and of withstanding the pressure which may prevail inside the vessel, it is customary to use walls with several layers, including at least a corrosion-resistant protective skin and a thick pressure shell which withstands the pressure and on which the protective skin is supported.

In various proposed multi-walled vessels the protective skin is supported on the pressure shell directly.

However, it has been found that double-walled vessels in which the two envelopes are separated by a gap also have advantages. In the case of some known methods the gap between the two envelopes is occupied by a fluid kept at a pressure substantially equal to that prevailing inside the vessel, so that practically no stress is applied to the thin protective skin. If the pressure is to be distributed uniformly over the entire inner envelope, of course, the fluid must be able to flow freely through the gap between the two envelopes. The envelopes are generally connected only by spaced blocks, intended solely to maintain the spacing between the envelopes. This system has the disadvantage that the thin protective skin cannot withstand any pressure on its own, so that even a momentary interruption in the balance of pressure on both sides of the skin may damage it.

In other known vessels the pressure of the fluid flowing between the two envelopes cannot be the same as that prevailing inside the vessel. This is so, in particular, if the fluid inside the gap is a heat transfer medium for absorbing the heat evolved in the reaction occurring inside the vessel, since the pressure of this fluid depends on its temperature and on its physical characteristics and is therefore difficult to adjust to the pressure inside the vessel. In this case it is essential for the spacer blocks between the protective skin and the pressure shell to provide sufficient support for each of these wall layers on the other, so that the protective skin is not deformed due to the pressure inside the vessel.

In our French Patent Application No. PV 70–23156, filed on June 23, 1970, we described two embodiments of a double-walled vessel of this type, with a system permitting heat exchange through the wall.

The present Application relates to a novel form of double wall capable of providing substantially continuous support for the protective skin on the pressure shell without interfering with the flow of fluid between the two walls.

According to the invention, the gap between the two envelopes is occupied by a grating whose thickness equals the width of the gap and which comprises an assembly of strips placed on edge and co-operating with one another to form a plurality of adjacent cells, each of which communicates with at least two of the adjacent cells.

In a particular embodiment of the invention, the grating comprises at least two superimposed layers, each of which is formed of a plurality of identical, regularly undulating strips placed on edge and touching one another along the crests of the undulations, the layers being offset relative to one another so that the undulations meet, the sum of the widths of the strips forming the superimposed layers being equal to the width of the gap.

In a more particular embodiment of the invention, the grating between the two envelopes comprises a plurality of ribbons whose widths are equal to the distance separating the walls and which are placed on edge side by side, and each of which is provided along its entire length with a series of aligned, equispaced central slits of equal lengths, each slit defining two strips formed into undulations symmetrically relative to the central plane of the ribbon, all the strips situated on a single side of the line of slits being undulated alternately on each side of the central plane of the ribbon and touching the corresponding strips in the adjacent ribbons along the crests of the undulations.

The invention will now be described in more detail with reference to a particular embodiment, given by way of example and illustrated in the accompanying drawing.

The single FIGURE is a perspective view of part of a particular embodiment of the invention.

As the FIGURE shows, the thick pressure shell 10 and thin protective skin 11 are separated by a gap $e$ containing a grating 2. In the embodiment illustrated the grating comprises a plurality of ribbons 21, 22, 23 etc. placed side by side and on edge between the walls 10 and 11, the width of the ribbons being equal to the gap $e$. Each ribbon contains a series of aligned, equispaced central slits 3 of equal lengths, each slit defining two strips 211, 212 half the width of the ribbon. The strips 211, 212 are made to undulate symmetrically on each side of the central plane of the ribbon 21. Also, the strips on the same side of the line of slits, such as strips 211 and 213 or strips 212 and 214, form undulations facing alternate sides of the central plane of the ribbon.

Straight portions 210 remaining between the slits follow the central plane of the ribbon.

Each ribbon therefore comprises two regularly undulating, superimposed strips whose undulations meet and are symmetrical relative to the central plane of the ribbon, the two strips having in common the straight ribbon portions 210 which correspond to the central portions of the flanks of the undulations.

The crests of the strips 211 or 212 advantageously have a straight portion 215 parallel to the central plane. The grating is then easily formed by placing the ribbons 21, 22, 23 side by side with the straight crests 215 of the corresponding undulations in contact with one another and then welding the crests together.

The resulting grating has two superimposed layers of meeting, or intersecting, undulations.

Each layer therefore comprises a lattice-work of substantially cruciform meshes 4, one of which is emphasized with a thick line in the FIGURE. The amplitude of the undulations in the ribbons can be selected to give a mesh fine enough for the protective skin 11 to be supported substantially continuously on the grating, taking its thickness into account.

Otherwise it is only necessary to select the thickness of the ribbon forming the grating according to the ribbon width $e$ to ensure satisfactory transmission of stresses on the skin 11 to the pressure shell 10, each mesh 4 in the upper layer bearing on two identical meshes in the lower layer.

The grating just described, which is easy to construct, can therefore transmit pressures exerted on the protective skin 11 to the pressure shell 10 very satisfactorily if the mesh width is selected according to the pressure inside the vessel and the physical characteristics of the skin 11.

As a result of its design, moreover, the grating does not prevent fluid from flowing between the two walls 10 and 11. Arrows in the FIGURE show how the fluid can flow easily from one cell to another, since each cell communicates with the adjacent cells.

The distribution of the fluid is therefore excellent in all directions, ensuring uniform cooling or heating of the protective skin when a heat transfer medium is used, and permitting a uniform compensating pressure to be exerted on the entire area of the protecitve skin when the fluid is intended to balance the pressure prevailing inside the vessel.

The grating may, of course, be welded to at least one of the walls. However, one of the principal advantages of the invention is that formal connections between the two envelopes can be omitted, the compression connections being provided by the grating which is simply placed between the two envelopes during construction of the vessel. Also, if it is necessary to minimize clearance between the protective skin 11 and the grating, the fact that the skin bears substantially continuously on the grating considerably inhibits buckling of the skin and ensures that the latter holds if the internal pressure disappears or if the inner envelope is subjected to pressure from the heat transfer medium. Even if not fixed to the grating, therefore, the inner envelope 11 can withstand a negative pressure to some extent. The absence of welds obviously reduces the cost of fabrication of the vessel and ensures that the properties of the protective skin cover the entire area of this skin. The grating described is easy to make and is also commercially available. It is even available in stainless steel, which resists corrosion from the fluid flowing between the walls.

There are various sorts of grating types, in particular some which are not rigid. Walls of all shapes can therefore be combined with the grating. A vessel embodying the invention will be very easy to make. The developed grating area corresponding to the area of the thick wall can be cut, and the grating then rolled up and placed inside the thick wall after the latter has been formed. A few spot welds are enough to fix the grating to the thick wall, before the thin wall is introduced. Some clearance may be left between the thin wall and the grating, to facilitate positioning of the thin wall; satisfactory application of the thin wall to the grating is then effected, for example, by means of a conventional hydraulic expansion technique. The protective skin may be made from a material whose elastic limit is high enough to withstand the stressing occurring during operation, but too low to withstand the testing pressure, so that the skin is applied to the grating perfectly during testing and then remains in this position, the clearance now being minimal.

It is also possible to make hemispherical ends, the grating being formed, for example, by stamping.

Obviously, the invention is not restricted to the details of the embodiment just described, which may be modified without exceeding the scope of the invention.

Although the grating described is formed of parallel ribbons, each comprising two or more layers of superimposed undulations, the undulating layers might be formed separately and then superimposed.

The superimposed layers preferably have a common straight portion to transmit stresses from one layer to the other. In certain cases, however, the undulations might meet at an angle, in which case point stressing occurs.

The mesh of the lattice applied to the pressure shell is not necessarily the same as that of the lattice supporting the protective skin. The latter mesh may be finer, while remaining compatible with the mesh in the lower lattice.

Whereas the grating described contains two layers, gratings with a larger number of superimposed layers might be used.

Also, the grating situated in accordance with the invention between the protective skin and the pressure shell is not necessarily formed of undulating strips as in the preferred embodiment described above by way of example.

For example, the grating could be formed of one or more layers each formed of at least two series of straight parallel strips placed on edge, the said series intersecting in pairs (at right-angles in the case of two series and at an angle of 60° in the case of three series) to form adjacent cells with polygonal peripheries. Where there is a single layer of intersecting strips, each strip would contain orifices to connect each cell to at least two of the adjacent cells. Where there are a plurality of layers, however, the layers would simply be offset relative to one another as in the case described above, so that each intersection in one layer would be above the interior of a cell in the layer below, so that each cell communicated with the adjacent cells.

A double wall embodying the invention has the advantage that it can be made very economically from a fairly common commercial material. Because the mesh of the lattice on which the protective skin bears is fairly fine, it provides substantially continuous support, so that the connections between the skin and the lattice supporting it can be omitted. Both stresses due to expansion of the thin wall as a result of the pressure inside the vessel, and compressive stresses which might buckle the thin wall if internal pressure dropped momentarily below the pressure of the fluid flowing between the walls can easily be absorbed.

If the fluid is intended to balance the pressure inside the vessel, a double wall embodying the invention can withstand a momentary accidental drop in the balancing pressure, as the thin inner wall then bears on the grating.

Because of the resulting substantially continuous support, any crack appearing in the protective skin would develop more slowly than in conventional vessels. Any leak due to a crack, even if slight, could be detected either by monitoring the pressure of the fluid circulating between the walls (if this pressure is substantially different from the pressure inside the vessel) or by monitoring the composition or properties of the fluid, for example its pH value, which would change if it mixed with the substance contained in the vessel.

We claim:

1. Improvements to vessels of which the wall comprises two equidistant envelopes separated by a gap within which a fluid can flow, a grating in the gap between the two envelopes, the thickness of the grating equalling the width of the gap and said grating comprising an assembly of strips on edge and cooperating with one another to form a plurality of adjacent cells, each of said cells communicating with at least two of the adjacent cells and said grating further comprising at least two superimposed layers, each of which is formed of a plurality of identical, regularly undulating strips on edge and touching one another along the crests of the undulations, the layers being offset relative to one another so that the undulations meet, the sum of the widths of the strips forming the superimposed layers being equal to the width of the gap.

2. Improvements to vessels as claimed in claim 1, characterized in that the offsetting of one layer relative to another is effected transversely relative to the direction of the strips and is equal to the amplitude of the undulations.

3. Improvements to vessels as claimed in claim 1, characterized in that each flank of an undulation in a strip has a straight central portion directed along the longitudinal axis of the strip, each strip in one layer being in contact with the corresponding strip in the other layer along the said straight portions.

4. Improvements to vessels as claimed in claim 3, characterized in that the straight central portions of two superimposed strips form integral pairs.

5. Improvements to vessels as claimed in claim 3, characterized in that the mutually touching crests of the undulations in two adjacent strips are welded together.

6. Improvements to double-walled vessels whose wall comprises two equidistant envelopes separated by a gap within which a fluid can flow, characterized in that the gap between the two envelopes is occupied by a grating comprising a plurality of ribbons whose widths are equal to the distance separating the envelopes and which are placed on edge side by side, and each of which is provided along its entire length with a series of aligned, equispaced central slits of equal lengths, each slit defining two strips formed into undulations symmetrically relative to the central plane of the ribbon, all the strips situated on a single side of the line of slits being undulated alternately on each side of the central plane of the ribbon and touching the corresponding strips in the adjacent ribbons along the crests of the undulations.

* * * * *